US005382947A

United States Patent [19]

Thaler et al.

[11] Patent Number: 5,382,947

[45] Date of Patent: Jan. 17, 1995

[54] REMOTE-CONTROLLED OPERATION SYSTEM FOR ELECTRICAL CONSUMERS

[75] Inventors: Markus Thaler, Hirzel; Peter Schmid, Horgen, both of Switzerland

[73] Assignee: Feller AG, Horgen, Switzerland

[21] Appl. No.: 961,682

[22] PCT Filed: May 26, 1992

[86] PCT No.: PCT/CH92/00099

§ 371 Date: Jan. 19, 1993

§ 102(e) Date: Jan. 19, 1993

[87] PCT Pub. No.: WO92/22047

PCT Pub. Date: Dec. 10, 1992

[30] Foreign Application Priority Data

May 30, 1991 [CH] Switzerland ........................ 01598/91

[51] Int. Cl.[6] ........................ H04B 1/00; H04B 10/02

[52] U.S. Cl. ........................ 340/825.22; 340/825.69; 340/825.72; 359/148

[58] Field of Search ........................ 340/825.69, 825.72, 340/825.22, 825.52; 359/145, 148

[56] References Cited

U.S. PATENT DOCUMENTS

| | | | |
|---|---|---|---|
| 4,538,973 | 9/1985 | Angott et al. | 340/825.72 |
| 4,633,247 | 12/1986 | Hegeler | 340/825.69 |
| 5,109,222 | 4/1992 | Welty | 340/825.72 |
| 5,227,780 | 7/1993 | Tigwell | 340/825.72 |

FOREIGN PATENT DOCUMENTS 301680 2/1989 European Pat. Off. .

*Primary Examiner*—Michael Horabik

*Attorney, Agent, or Firm*—Watson, Cole, Grindle & Watson

[57] ABSTRACT

An operation system for electrical consumers (19) has an operating device with a transmitter and control devices with receivers (16). The control devices have an evaluation unit (17) and a control unit (18) which is driven by the evaluation unit and controls the electrical consumers (19). The evaluation unit (17) distinguishes between control signals and scenario commands. When specific scenario commands are received, the state of the control unit (18) and hence the state of the electrical consumer (19) can be stored and re-established. A separate converter which evaluates the signals received from the transmitter and forwards them to the control devices can preferably also be used.

6 Claims, 7 Drawing Sheets

REMOTE-CONTROLLED OPERATION SYSTEM FOR ELECTRICAL CONSUMERS

FIELD OF THE INVENTION

The present invention relates to a remote-controlled operation system for electrical consumers which has an operating device with a transmitter and at least one control device with a receiver, to which the electrical consumers are connected, the control device having an evaluation unit which evaluates signals received from the transmitter and a control unit for the consumer to be connected.

PRIOR ART

A wide variety of control means or operating means exist in particular for household electrical consumers such as light fixtures, audio equipment, light protection systems such as sun blinds and the like. The majority of such electrical consumers are customarily operated by means of switches situated directly in the power leads, that is to say are switched on and off, and are also controlled if necessary. Frequently audio equipment such as television sets and HiFi units, in particular, is customarily operated by means of remote controllers, in which case the devices are usually provided with a constant power supply via the power supply network. Remote-controlled switches for light fixtures are also already in use in a few cases. Common to all these devices is the fact that each individual consumer is operated using its own operating means, that is to say, for example, when there are a large number of devices in a room, a plurality of transmitting devices are required and are present for operating the individual consumers.

The object of the present invention is then the capability of remote-controlled operation of a plurality of electrical consumers by means of a control system and at the same time the ability to store preset states of the various consumers and call them up again simply when required.

SUMMARY OF THE INVENTION

This object is achieved according to the invention in that the evaluation unit contains storage means for storing at least one state of the control unit, which is driven according to the evaluation of the evaluation unit.

The storage means preferably contains a state register and a state table, the evaluation unit transferring the current state of the control unit used for controlling the control unit from the state register into the state table when a store command is received.

In accordance with a preferred embodiment, the state table contains a plurality of memory locations with corresponding memory location numbers, and a store command is transmitted with a scenario number corresponding to a memory location number, the current state of the control unit being transferred into the corresponding memory location of the state table.

When a retrieve command with a corresponding scenario number is received, the state of the corresponding memory location of the state table is transferred into the state register.

The operation system preferably contains means for the selective storage of a scenario in selected control devices.

A further embodiment of the invention is one wherein it contains a separate converter which retransmits the control signals received from the operating device and processes commands received from the operating device and retransmits them as scenario commands.

The converter preferably contains, connected to an evaluation unit, a receiving part, memory, keypad and transmitting part, and the transmission between the operating device, the converter and the control devices is based on individual telegrams with an address field and a data field. The depression of a key on the keypad prepares the evaluation unit of the converter to interpret the address field of the next telegram received from the operating device as a special command and to retransmit it as a scenario command.

DESCRIPTION OF THE INVENTION

An exemplary embodiment of the invention will be explained in greater detail below with reference to drawings, in which.

DESCRIPTION OF THE PREFERRED EMBODIMENTS

Figure 1:
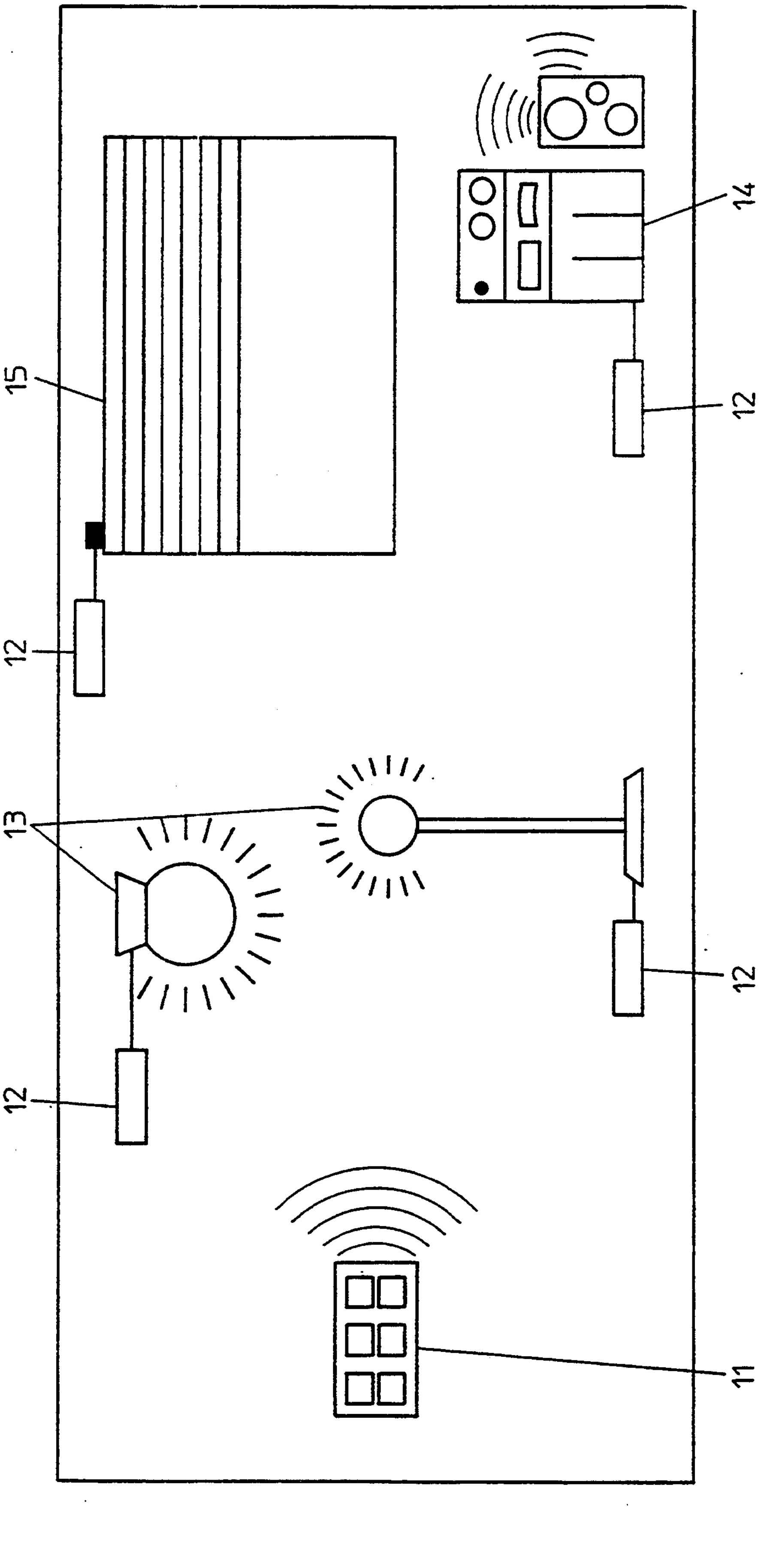
FIG. 1 shows the room diagram of an operation system for electrical consumers.

FIG. 1 shows the basic design of an infrared remote-controlled operation system for electrical consumers. Various consumers, here light fixtures 13, audio unit 14 and window blinds 15 for example, are controlled by control devices 12 by means of an operating device 11 which is designed in the form of a hand-held transmitter. Said consumers can be switched on and off, or controlled if required, depending on the function range of the control devices 12.

Figure 2:
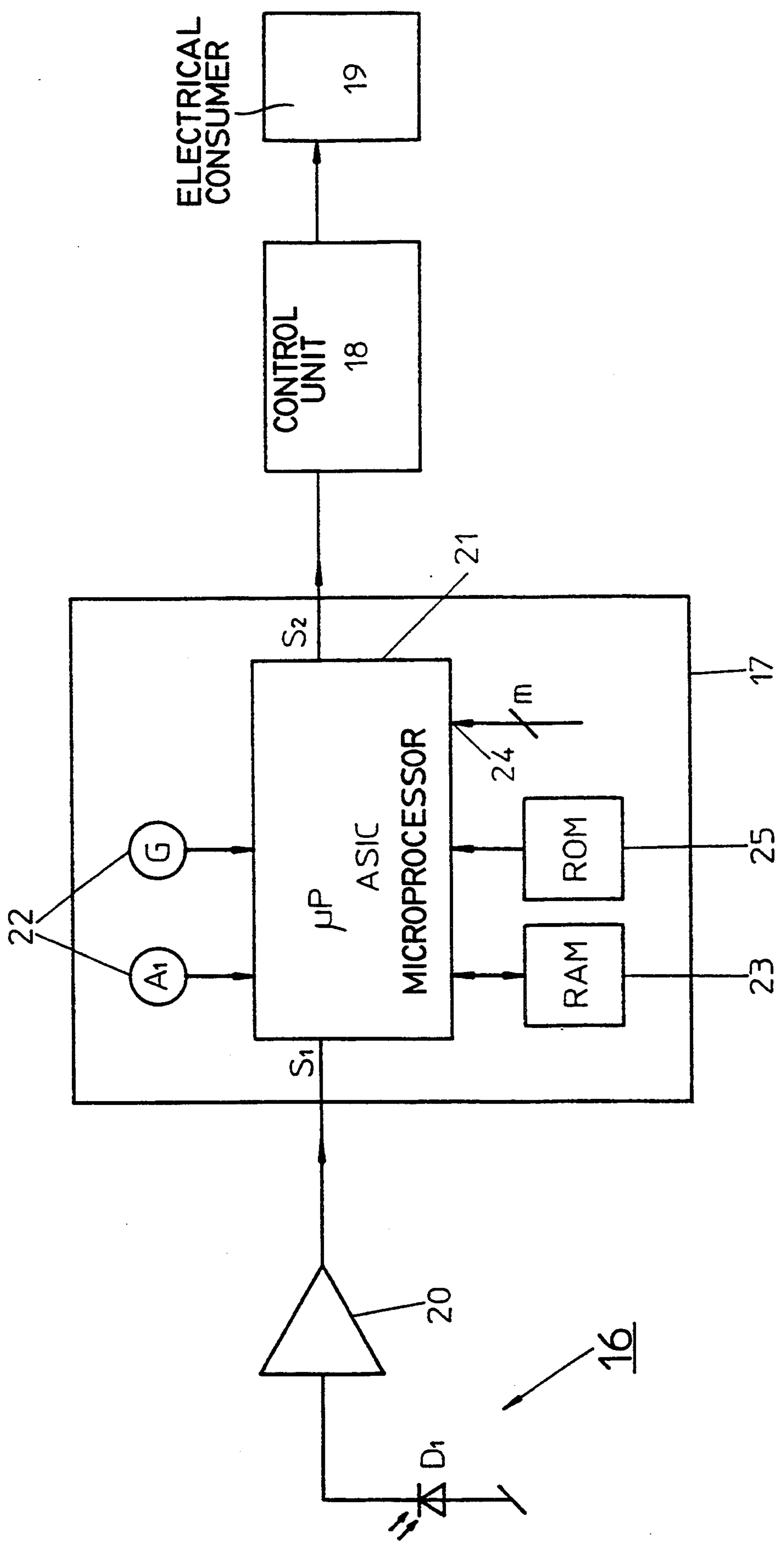
FIG. 2 shows the block circuit diagram of a control device.

FIG. 2 shows the schematic block circuit diagram of a control device 12. The signals transmitted by the transmitter are received by means of a receiver 16 and are supplied to an evaluation unit 17. Said evaluation unit 17 evaluates the signals S1 supplied to it and drives a control unit 18 accordingly. An electrical consumer 19 is connected to said control unit 18. For light fixtures, for example, said control unit 18 is designed in such a way that it can vary the light intensity of the light fixture by controlling the current. Corresponding control signals come from the evaluation unit 17 in this case.

The receiver 16 comprises a receive diode D1 which converts infrared signals into current, and a preamplifier 20 which conditions the weak current signals received in such a way that they can be processed further by a downstream microprocessor or ASIC 21 of the evaluation unit.

The transmission of commands between the transmitter (operating device 11) and the receivers 16 of the control devices 12 is based on individual infrared command telegrams, in which the information is digitally encoded. Each telegram contains at least one address field with address bits and one data field with data bits.

The evaluation unit 17 (FIG. 2) contains, for example, two coding switches 22 to determine a device address A (3 least significant bits) and a group address G (3 most significant bits). The microprocessor or ASIC 21 reads in said addresses (G, A) when a command telegram is received and compares the address field with the address set at the receiver 16. If the addresses match, the command is stored for further processing.

A plurality of control devices 12 can be addressed with an operating device 11 by means of the address coding of the command telegrams.

Specific special commands are preferably transmitted as special addresses in the address field of a telegram, it being possible for all the control devices to receive and execute said special commands together.

In order to store a current state of the control unit 18 and hence of the electrical consumer 19, for example the light fixture, the evaluation unit 17 contains a memory 23 (RAM or EEPROM).

The memory 23 permits the storage of states for driving the control unit 18. The microprocessor or ASIC is notified via m MODE inputs 24 which type of control unit 18 is to be driven, whereupon it then calls up the corresponding program in the program memory 25 (ROM). It is thus possible to generate a plurality of different control signals S2 for various control units (for example generalized phase control, relay, etc.) with a single microprocessor or ASIC, to be precise depending on the MODE inputs.

Figure 3:
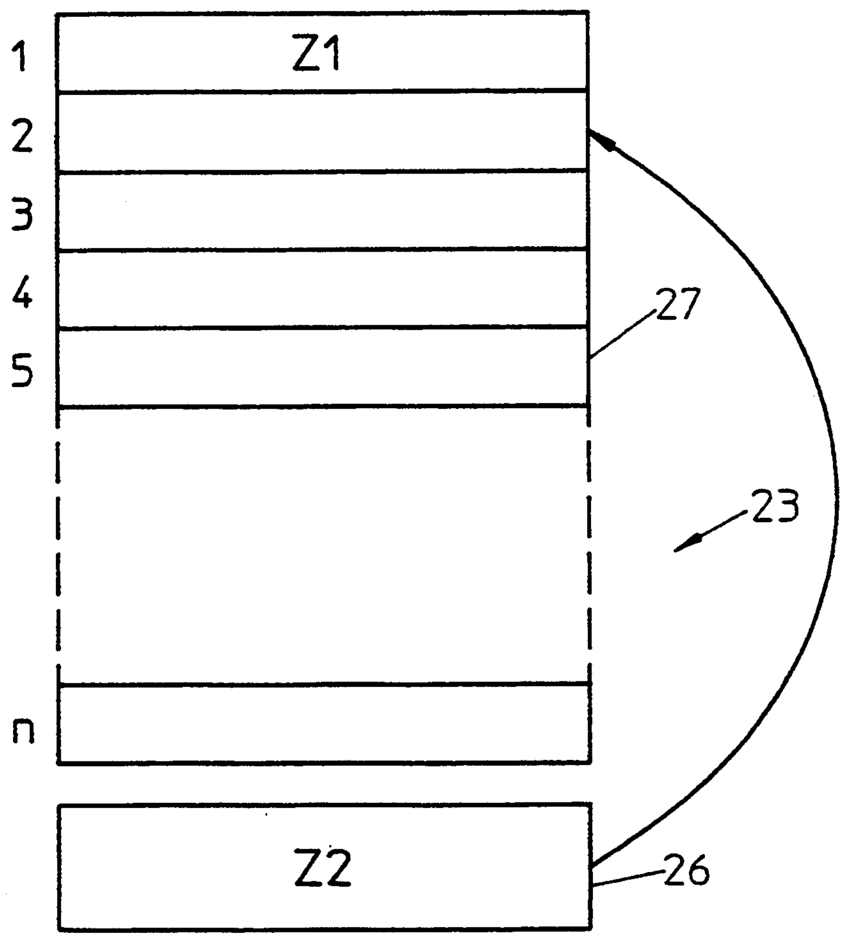
FIG. 3 shows a memory of the control device.

The memory 23 contains a state register 26 which stores the current state of the control device, that is to say the actuation values for driving the control unit (FIG. 3).

The current state of the control device 12 can be stored, activated, deleted or temporarily deactivated in the evaluation unit 17 of the control device 12 by corresponding commands or scenario commands of the operating device. The microprocessor or ASIC 21 transfers the current state from the state register 26 into a state table 27 of the memory 23 by means of a store command. Said state can be called up again by means of a retrieve command, in which case the microprocessor or ASIC 21 transfers the desired state from the state table into the state register and uses it as the current state value for driving the control unit.

The state table 27 is preferably designed with sufficient capacity for storing a plurality of states.

Figure 4:
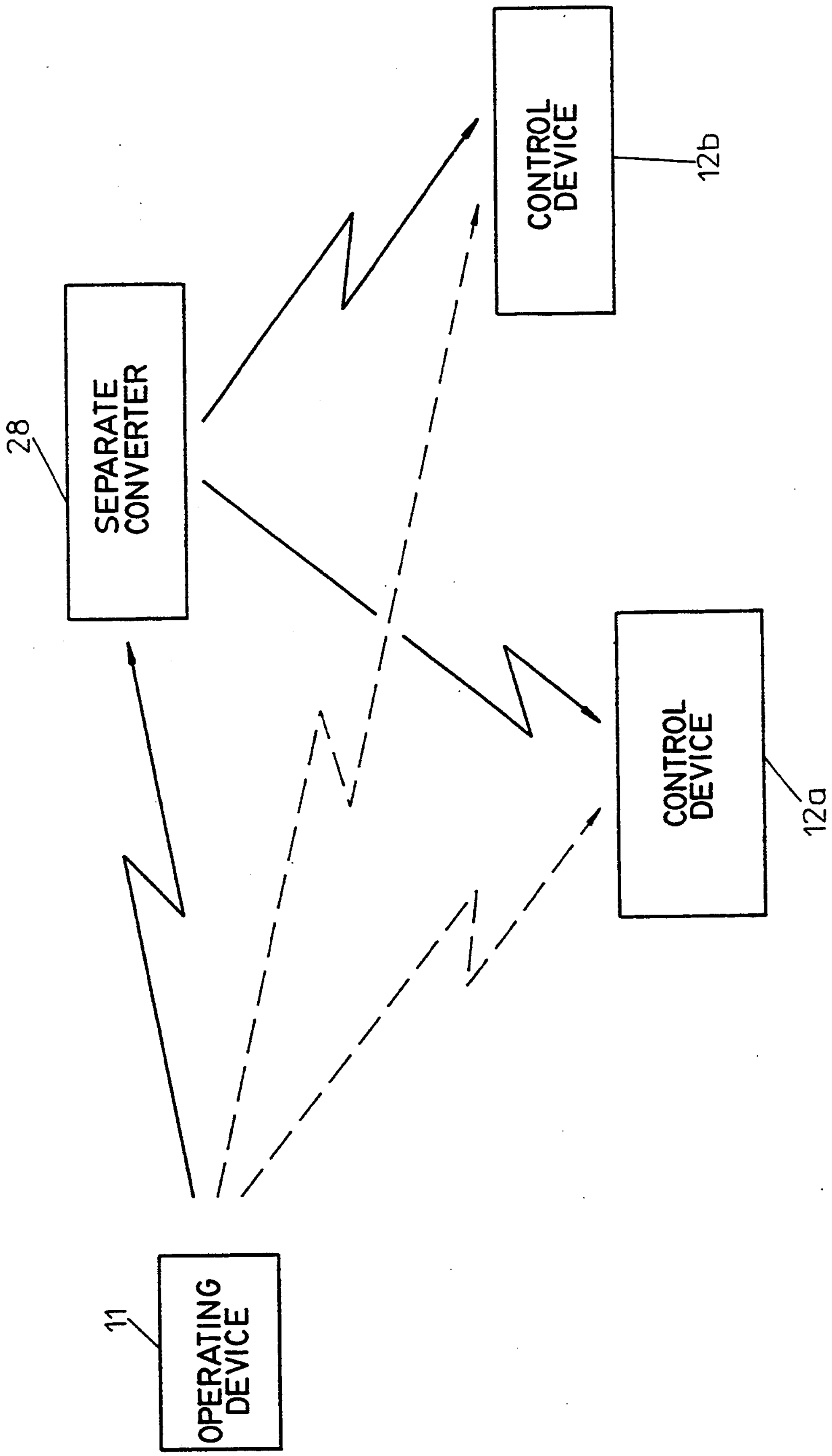
FIG. 4 shows an operation system with converter.

The use of a separate converter 28, as illustrated diagrammatically in FIG. 4, proves to be particularly advantageous. Said converter is positioned at the most suitable location in the room and has as its task the amplification and forwarding of the signals emitted by the operating device 11.

The control devices 12*a* and 12b, for example, are driven by the operating device 11, in which case the converter 28 simultaneously receives the commands and is able to retransmit them amplified after a short time (approx. 1 ms). The control devices are designed in such a way that any duplicated reception of a command is correctly interpreted.

According to a preferred embodiment (FIG. 5), the operating device 11 comprises a keypad 29 with 4 keys T1, T2, T3, T4, a microprocessor or ASIC 30, an address presetting means 31 and a transmitter stage.

When any of the keys (T1, . . . T4) is pressed, the output signal S3 of the keypad 29 is read in by the microprocessor or ASIC 30 and indicates which key on the keypad was pressed. The microprocessor or ASIC 30 generates a signal S4 therefrom, which selects, by means of a logic circuit 32 of the address presetting means 31, a device address set on the operating device with the aid of coding switches A1, A2, A3, A4.

Each key of the keypad is assigned to exactly one of said device addresses. The selected device address A5 determines the 3 least significant bits of the address field in the telegram, and is read in by the microprocessor or ASIC 30. At the same time a group address set with a coding switch G1 is read in by the microprocessor or ASIC 30 and determines the 3 most significant address bits of the telegram.

The microprocessor or ASIC 30 generates a control signal S5. The control signal S5 contains address bits (A5, G1) and data bits, which correspond to the length of the key depression for example. The control signal S5 controls a current source 33 connected in series with a transmit diode D2. The diode D2 generates a light signal in the infrared range in accordance with the current.

According to a preferred embodiment, the scenario commands are triggered by the converter 28. All the control devices 12 situated within the receiving range of the converter 28 can receive said scenario commands regardless of the address (G, A, FIG. 2) set on the control device. The totality of all the actuation values which can be stored with a scenario command in the accessible control devices is termed a scenario; this may be a lighting mood, for example, if all the control devices 12 contain control units 18 for controlling luminaires.

A total of five commands can be executed: store scenario (spontaneously or selectively), retrieve scenario, delete scenario, delete all scenarios.

Figure 6:
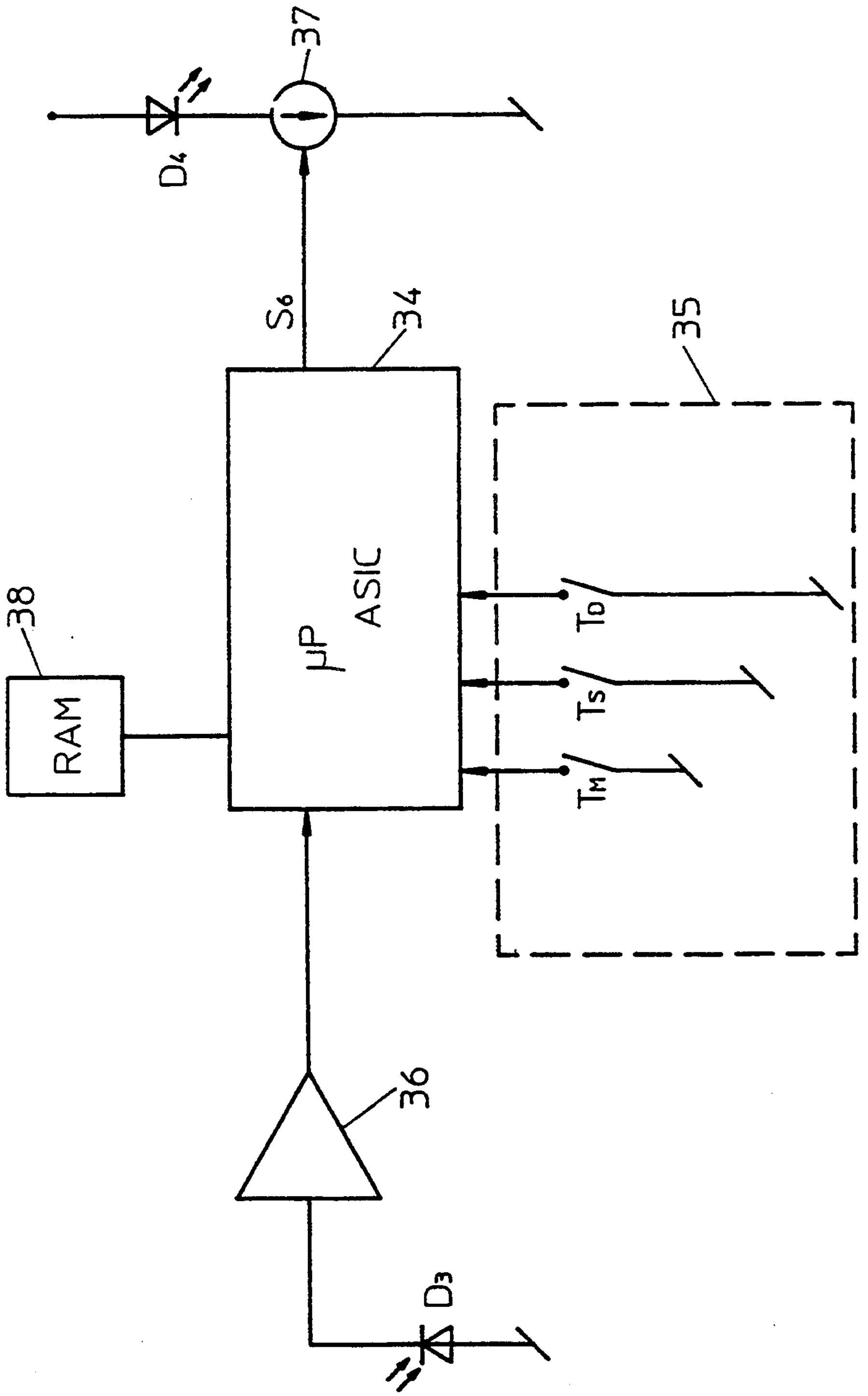
FIG. 6 shows the block circuit diagram of the converter.

The converter 28 contains (FIG. 6) a receiving part, a microprocessor or ASIC 34, a keypad 35 and a transmitting part.

The receiving part comprises a receive diode D3 which converts the infrared signals into current, and a preamplifier 36 which conditions the weak current signals received in such a way that they can be processed further by the downstream microprocessor or ASIC 34. The transmitting part comprises a current source 37 which is connected in series with at least one transmit diode D4 and which is controlled by control signals S6 of the microprocessor or ASIC 34.

The keypad 35 contains three keys, a MEMO key TM, a SELECT key TS and a DELETE key TD, which can be read by the microprocessor or ASIC 34.

A memory 38 (RAM or EEPROM) of the converter 28 contains a scenario table 39 (FIG. 7) with n memory locations (n=16 for example), with corresponding memory location numbers (1, 2, 3, . . . n).

The state tables 27 of the control devices (FIG. 3) also contain n memory locations with corresponding memory location numbers 1, 2, 3 . . . n.

The system permits the storage of set states of all the control devices within the receiving range of the converter 28. n scenarios can be stored in any number of control devices.

Once the control devices 12 have been set as desired with the operating device 11, the MEMO key TM is pressed on the converter 28. As a result, the microprocessor or ASIC 34 of the converter 28 is prepared to interpret the address field of the next telegram received from the operating device 11 as a scenario command. A key is now pressed on the operating device with which the relevant scenario is to be called up in future. The various memory locations of the scenario table 39 are searched through for the corresponding telegram address in the converter 28. If the address is found, the corresponding memory location number is read out by the microprocessor or ASIC 34. If the address is not found, the first free memory location in the scenario table 39 is sought, the address is stored and the corresponding memory location number is read out.

If the scenario table 39 is full, this is indicated to the user by a flashing warning message. In order for it to be possible to program a new scenario in this case, an existing scenario must first be deleted. A store command with the memory location number read out is then sent by the converter 28 to all control devices as the scenario number. According to FIG. 3, the current state (actuation value for the control unit) is entered in the state table in the control device under the corresponding memory location number, the existing actuation value being thereby overwritten.

Figure 5:
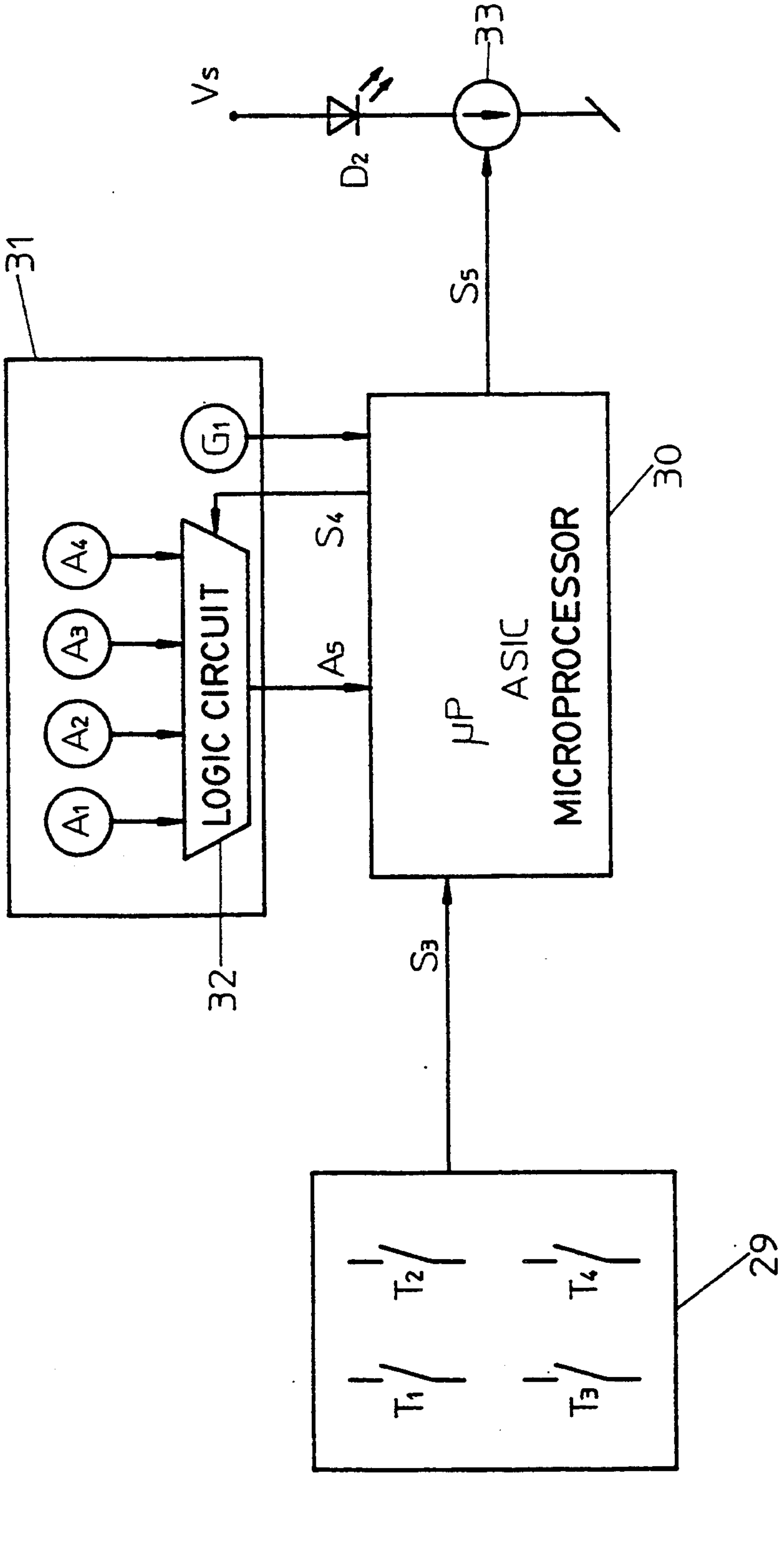
FIG. 5 shows the block circuit diagram of an operating device.
Figure 7:
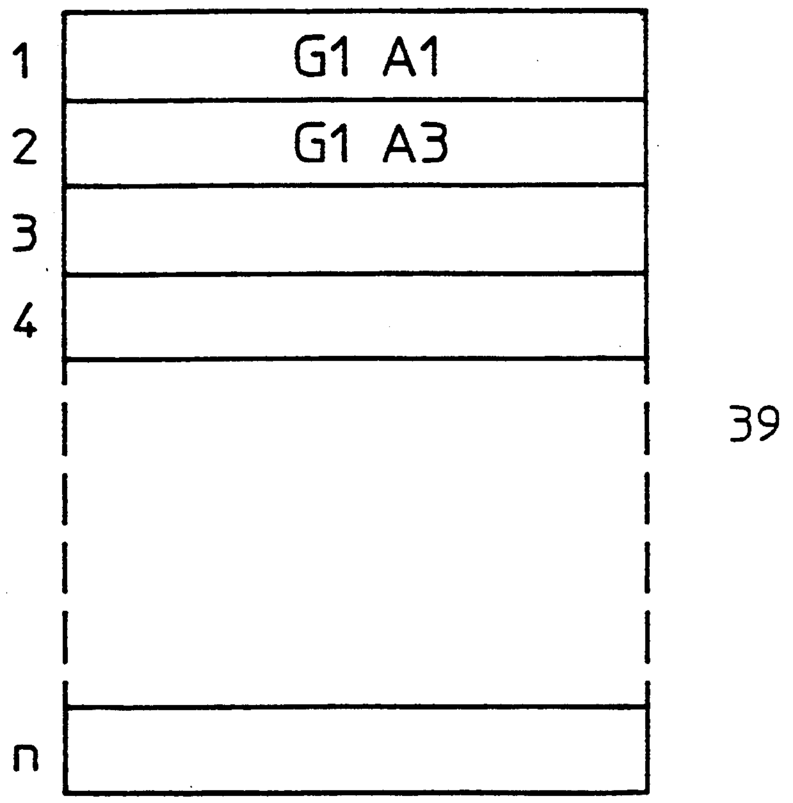
FIG. 7 shows a memory of the converter.

FIGS. 3 and 7 shows the storage of two scenarios by way of example. The already stored first scenario with scenario number 1 corresponds to the telegram address G1A1 which is activated by key T1 of an operating device with group address G1 (FIG. 5). The address G1A1 is stored in the memory location number 1 of the scenario table 39 and the corresponding state Z1 is stored in the memory location number 1 of the state table 27 of a control device. To store a scenario corresponding to a state Z2, said state is first set using the control device 12. The key TM is then pressed followed by the key T3 of the operating device 11. The operating device 11 sends a telegram with the address G1A3. Said address is interpreted by the converter as a scenario command and the address G1A3 is sought in the scenario table 39. Since only scenario 1 is stored in the scenario table, all other memory locations 2, 3, . . . n are empty.

The address G1A3 is stored in the next empty memory location and the corresponding memory location number (2) is sent as scenario number 2 with a store command by the converter 28. All the control devices 12 within the receiving range receive said store command with scenario number 2. The current state Z2 of the state register 26 is transferred into the memory location number 2 of the state table 27.

A scenario is called up by pressing the key assigned to the scenario on the operating device. The microprocessor or ASIC 34 of the converter 28 searches in the scenario table (FIG. 7) for the address from the address field of the telegram transmitted by the operating device. If the address is found, a scenario retrieve command with corresponding scenario number is sent to the control devices, otherwise the received telegram is retransmitted after amplification. The scenario retrieve command is handled as follows in the control device:

If the state value stored under the scenario number is not found to be empty (not defined), the state value is transferred into the state register 26 as current state value for driving the control unit.

If, for example, the scenario 1 is to be called up, then for example the key T1 of the operating device 11 is pressed. The microprocessor or ASIC 34 of the converter 28 finds the corresponding address G1A1 in the memory location 1 of the scenario table 39 and sends a retrieve command with the scenario number 1. In the control device, the microprocessor or ASIC 17 detects the retrieve command and transfers the state value Z1, which is stored in the memory location 1 of the state table 27, into the state register 26.

With this method only the assignment between the key on the operating device (with set address) and the scenario is evident to the user, the system selects the corresponding scenario numbers independently.

The system preferably permits a selective programming of a scenario. In this case a scenario is consciously programmed and individual control devices can be consciously declared as not belonging to the scenario. No entry is made under the corresponding scenario number for these control devices in the state table.

In order not to use a separate store and retrieve command for each control device, a reset signal which marks all the existing control devices as not affected is preferably transmitted before a state is stored.

A reset signal is sent by the converter 28 by pressing the SELECT key TS of the converter 28. Each control device that receives said reset signal will detect it and mark itself as not affected. A control device marked as not affected will ignore the next store command. If the state value stored in the state register 26 of the control device is now altered, by means of any control signal sent specifically to it from the operating device, then, in addition to the execution of the corresponding action, said control device is marked as active. If a control device marked as active now receives a store command, then the current state is transferred into the state table. In this way all the control devices whose state was altered in some way or other since reception of the reset signal are incorporated in the scenario.

Once all the desired control devices have been set to the corresponding state, the MEMO key TM must be pressed on the converter. The further procedure is the same as in the scenario storage described above, except that the state value is stored only at the active control devices. The SELECT mode is reset at the same time.

It is thus possible to set, for example, a room atmosphere individually by means of the installed light fixtures and to store this state. Said state can then be re-established at any time simply by pressing a key. It is particularly advantageous here that the consumers not belonging to the scenario are not influenced thereby. If table 27 is used to store a plurality of states, then, for example, several users can store their individual settings and call them up again at any time under the corresponding scenario number.

This selective programming is used especially in situations where consumers are to be excluded from a scenario, for example if a radio is to be switched on and off by means of a control device irrespective of the desired lighting scenario.

A scenario assigned to a key of the operating device can be deleted by pressing the DELETE key TD on the converter, whereupon the converter is prepared to use the address of the next telegram as the address for the scenario to be deleted. The key assigned to the scenario must then be pressed on the operating device. In the converter 28, the scenario number corresponding to the address is sought in the scenario table 39, and if it is found, the address entry is set to empty (not defined), then a scenario delete command with this scenario number is sent to all control devices. The actuation value is set there in the state table 27 to empty (not defined) under the corresponding scenario number.

According to a preferred embodiment, all scenarios can be deleted simultaneously by pressing the DELETE key TD of the converter longer than a specified time, for example 5 s.

All the entries in the scenario table 39 are then set to empty and a special command is sent to the control devices to delete all scenarios. All the memory locations in the state table are set to empty therein.

All scenario commands, that is to say store commands, retrieve commands, delete commands and reset signals, are preferably transferred as special addresses into the address field of a telegram. Each control device then reacts to the reception of said scenario command, in which case the necessary scenario number is then transmitted in the data field of the telegram if necessary.

The following addresses may correspond to the following scenario commands by way of example:

Store command: 111 110

Retrieve command: 111 101

Delete command: 111 100

Reset signal: 111 011

We claim:

1. A remote-controlled operation system for controlling a plurality of electrical consumer devices, the system comprising:

an operating device with a transmitter for transmitting control signals including store command and retrieve command signals;

each said consumer device including a receiver for receiving said control signals and a control device including an evaluation unit for evaluating signals received by said receiver;

said consumer device further including a control unit for controlling the associated consumer device, each said evaluation unit including storage means for storing at least one state of an associated control unit and for driving said associated control unit;

each said storage means including a state register for storing a current state of the control unit and a state table;

said evaluation unit transferring the current state of the control unit used for controlling the control unit from said state register into said state table upon receipt of said store command signal;

said state table including a plurality of memory locations with corresponding memory location designations, and wherein a store command is transmitted from said state table with a scenario number corresponding to a memory location designation, the current state of said control unit being transferred into the corresponding memory location of said state table; and each of said consumer devices transferring the corresponding memory location of said state table into said state register upon receipt of a retrieve command.

2. A remote-controlled operation system as claimed in claim 1, wherein the operation system further comprises means for the selective storage of a scenario in selected ones of said control devices only.

3. A remote-controlled operation system as claimed in claim 2, wherein said means for the selective storage transmits a reset signal before the transmission of a store command so that all said control devices mark themselves as not affected when the reset signal is received, and ignore the next store command, and a selective alteration of the state of the state register upon receipt of said retrieve command marks selected control devices as active again between the reception of the reset signal and the reception of the store command, and permits the selective storage of a scenario in said selected control devices.

4. A remote-controlled operation system as claimed in claim 1, further comprising a separate converter which amplifies and transmits control signals received from said operating device and processes predetermined commands received from the operating device and retransmits said commands as scenario commands.

5. A remote-controlled operation system as claimed in claim 4, wherein said separate converter includes a microprocessor, a keypad for controlling said microprocessor, a receiver for receiving control signals from said operating device, and a transmitter for transmitting control signals to each of said control devices, and wherein the transmission between the operating device said separate converter and said control devices is based on individual telegrams with an address field and a data field, and wherein the depression of a key on the keypad prepares the microprocessor of said separate converter to interpret the address field of the next telegram received from said operating device as a special command and to retransmit said command as a scenario command.

6. A remote-controlled operation system as claimed in claim 5, wherein the memory of said separate converter includes a scenario table including a plurality of memory locations with corresponding memory location numbers.

* * * * *